ns, or 3,004,160
Patented Oct. 10, 1961

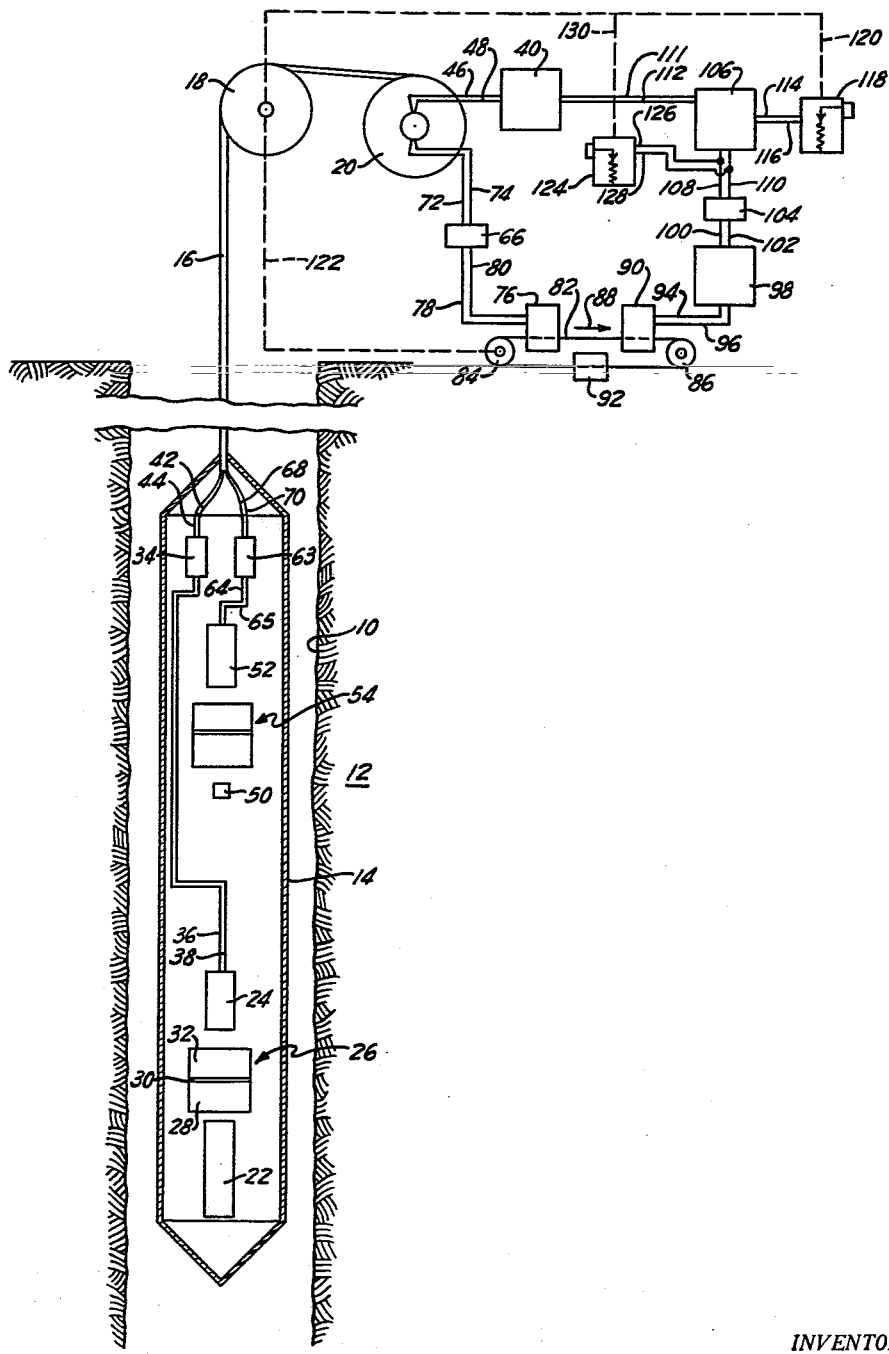

3,004,160
RADIATION BOREHOLE LOGGING
Charles W. Tittle, Newton, Mass., assignor to Gulf Research & Development Company, Pittsburgh, Pa., a corporation of Delaware
Filed July 11, 1957, Ser. No. 671,251
5 Claims. (Cl. 250—83.1)

The present invention pertains to new and useful improvements in neutron borehole logging, and pertains more particularly to a method of and apparatus for obtaining neutron borehole logs of interpretive value with respect to the total oxygen content of the earth formations being logged and also with respect to the water filled porosity and/or hydrogen content of the earth formations.

The present invention is somewhat related to that disclosed in my similarly assigned application U.S. Serial No. 671,250 entitled "Radiation Logging" filed July 11, 1957, now abandoned.

Broadly, the present invention involves sequentially producing two neutron-penetrating radiation logs wherein one of said logs is obtained using source neutrons having energies sufficient to be captured with good probability by and to cause disintegration of $_8O^{16}$ nuclei, and wherein the other log is obtained using source neutrons, preferably fast neutrons having energies insufficient to be captured by $_8O^{16}$ nuclei, and correlating the two logs to obtain information of interpretive value with respect to the oxygen content of the earth formations.

That correlation of such logs is of interpretive value with respect to the oxygen content of the earth formations stems from the fact that a neutron-penetrating radiation log obtained where the source neutrons have energies sufficient to be captured with good probability by and to cause disintegration of $_8O^{16}$ nuclei are employed results in a log that is pre-eminently a function of the concentrations in the earth formation of both oxygen nuclei and hydrogen nuclei, whereas a neutron-penetrating radiation log obtained where source neutrons, preferably fast neutrons, having energies insufficient to be captured by $_8O^{16}$ nuclei is pre-eminently a function of the concentration of hydrogen nuclei, rather than both hydrogen and oxygen nuclei. Such logs can then be so correlated so as to obtain values that are substantially solely a function of oxygen concentration in the earth formations. Before proceeding with a description of more specific aspects of the invention, the expression "neutron-penetrating radiation log" should be defined. By "penetrating radiation" is meant either neutrons and/or gamma rays, it being well recognized in the art that neutrons and gamma rays are much more penetrating in most media than are other radiations, such as beta particles, alpha particles, protons, etc. Accordingly, a neutron-penetrating radiation log is a log obtained by employing a neutron source and detecting either neutrons and/or gamma rays. As will be seen presently, specific forms of neutron-penetrating radiation logs can be distinguished from each other as to either the energies of the source neutrons or as to the particular class of penetrating radiations, that is, neutrons or gamma rays detected. Also, the logs cannot only be distinguished as to the class of penetrating radiation detected, but also as to particular energies or range of energies of radiation detected. Generally speaking, the present invention is concerned with detecting slow neutrons, that is, neutrons having less than about 100 to 300 electron volts or gamma rays irrespective of their energy, or both such neutrons and such gamma rays. Preferably, when only gamma rays are detected, it is preferred that only gamma rays having energies above about one mev. be detected. Ordinarily, in the practice of the invention, it is preferred that the class of penetrating radiation detected be either epithermal or thermal neutrons, or both; however, it is especially preferred that the detection of penetrating radiation be limited to solely epithermal neutrons. In order of decreasing preference, the detection of penetrating radiation is limited to epithermal neutrons, gamma rays having energies above about one mev., gamma rays irrespective of energy, epithermal and thermal neutrons, both slow neutrons and gamma rays, and thermal neutrons. The reason for the indicated order of preference is that in the order enumerated, the rate of detection of such classes of penetrating radiation more closely represents the functions of either hydrogen and oxygen, or solely hydrogen as previously described. It will become apparent subsequently that inasmuch as two neutron-penetrating radiation logs are produced, one of such logs can involve the detection of one class of penetrating radiation, while the other can involve the detection of a differing class of penetrating radiation, though it is preferred that both of such logs involve the detection of identical classes of penetrating radiation. Irrespective of the individual classes of penetrating radiation detected in producing the two logs, it is essential that the energies of the neutrons produced by the two neutron sources differ in the manner previously outlined.

A more specific aspect of the invention involves the method of and apparatus for producing both of the two neutron-penetrating radiation logs during a single logging run, and correlating the two logs with respect to individual portions of the earth formation in such a manner as to produce a single logging record of direct interpretive value with respect to the oxygen content of the earth formations logged. In greater detail, this aspect of the invention involves vertically spacing one neutron source and its associated detector from the other neutron source and its associated detector, producing electrical signals related to the response of both of the detectors, and appropriately mixing the two electrical signals to produce an electrical signal that is recorded relative to the depth of particular portions of the earth formations with respect to which the detectors' responses are related, together with provision for so timing the mixing of the signals to compensate for the time delay occurring after one detector produces a response to a particular portion of the earth formations until the other detector produces a response related to the same particular portion of earth formations.

The invention will be best appreciated in the light of the following detailed description of a preferred embodiment of the invention diagrammatically illustrated in the accompanying drawing.

Referring to the drawing, the numeral 10 designates a borehole traversing earth formations 12. The borehole 10 can be either cased or uncased.

Disposed within the borehole 10 for vertical movement is a probe housing 14 that is suspended upon a supporting cable 16 that is in turn entrained over a supporting pulley 18 and wound upon a conventional reel 20. The reel 20 is provided with conventional means, not shown, for driving and braking the same whereby the probe housing 14 can be raised and lowered within the borehole 10. The supporting cable 16 is conventional in character and is of the type that includes insulated electrical conductors therein, not shown.

Disposed within the lower portion of the probe housing 14 is a source of high energy neutrons 22. The neutrons produced by the neutron source 22 must have energies sufficient to have a good probability of being captured by and to cause disintegration of $_8O^{16}$ nuclei. Neutrons having energies from about 8 to about 20 mev. are suitable for this purpose. In the preferred construction, the neutron source 22 is a D·T source, which as is known produces neutrons having energies of about 14 mev. Another advantage of such a preferred form of neutron source is that the neutrons are essentially monoenergetic. The neutron source 22 can conveniently be of any conventional D-T type, though it is preferred that the same be one such as those disclosed in pending applications, Serial No. 580,833, entitled "Borehole Logging," Serial No. 580,834, entitled "Logging Apparatus," and Serial No. 580,906, entitled "Stabilized Borehole Logging," all of which were filed April 26, 1956 by William E. Mott, similarly assigned, such preference being for the reason that the more stable the neutron output, the better. Situated within the probe housing 14 a spaced interval from the neutron source 22 is a penetrating-radiation detector 24, preferably an epithermal-neutron detector such as that disclosed in my similarly assigned U.S. Patent No. 2,769,915, entitled "Epithermal Neutron Detector," issued November 6, 1956, though the same can be a conventional slow or thermal neutron detector such as a boron trifluoride filled proportional counter or a gamma-ray detector such as a conventional combination of a scintillation crystal and photomultiplier tube. The function of the epithermal-neutron detector 24 is to produce an electrical pulse upon each detection of an epithermal neutron. Should one of the other above-specified types of detectors be employed, it will be understood that the function of the detector is analogous with respect to the specific class of penetrating radiation to which the same is sensitive.

For the purpose of shielding the detector 24 from the direct passage of penetrating radiation produced in or in the immediate vicinity of the neutron source 22, a composite shield 26 is interposed between the source 22 and the detector 24, such shield 26 being conveniently comprised of a mass of hydrogenous material such as paraffin 28, a layer of boron or cadmium 30, and gamma-ray shielding material such as bismuth or lead 32. The electrical pulses produced in the response of the detector 24 are fed to an amplifier 34 situated in the upper portion of the probe housing 14 by electrical leads 36 and 38. Electrical pulses amplified by the amplifier 34 are fed to a counting rate meter or integrating circuit 40 situated at the earth's surface by means that includes electrical conductors 42 and 44, concealed electrical conductors in the cable 16, and electrical leads 46 and 48 connected to the inner end of the cable 16 on the reel 20.

The function of the counting rate meter or integrating circuit 40 is to produce an electrical signal that is linear with respect to or proportional to the rate at which electrical pulses are fed to the same. Subsequent treatment of the electrical signal effected by the counting rate meter or integrating circuit 40 will be described later.

Situated in the probe housing 14 in vertically spaced relation to the previously described neutron source 22 and detector 24 is a further neutron source 50. The neutron source 50 is conventional in character and is of the type that produces fast neutrons having energies less than that required for a substantial amount of capture thereof by $_8O^{16}$ nuclei. Suitable for this purpose is either a radium-beryllium or polonium-beryllium neutron source, though the former is preferred notwithstanding the fact that the same produces gamma rays because of the relatively short half life of polonium. Also suitable for this purpose is a D-D neutron source, which produces neutrons of about 2.5 mev. in energy. These neutrons are incapable of producing disintegrations of $_8O^{16}$ nuclei. Disposed in vertically spaced relationship to the neutron source 50 is a penetrating radiation detector 52 which can be any of the types such as that previously indicated as suitable for the detector 24. Here again, it is preferred that the detector 52 be an epithermal-neutron detector or of the same type as that used for the detector 24. Interposed between the neutron source 50 and the detector 52 is a composite penetrating-radiation shield indicated generally at 54 which is of the same character and for the same purpose as the previously described shield 26. The neutron source 22 and the detector 24 are vertically spaced a sufficient distance from the neutron source 50 and the detector 52 so that the response of the detector 52 is substantially unaffected by the neutron source 22, and so that the response of the detector 24 is substantially unaffected by the neutron source 50.

The electrical pulses produced by the response of the detector 52 are fed to a conventional amplifier 63, that is preferably identical to the amplifier 34, by electrical leads 64 and 65. The amplified electrical pulses produced by the amplifier 63 are fed to a further amplifier 66 of the same character as amplifier 34 by means that includes electrical leads 68 and 70, concealed electrical conductors in the cable 16, and electrical leads 72 and 74 connected to the inner end of the cable 16 on the reel 20.

The output of the amplifier 66 is fed to a recording head 76 such as that used in magnetic tape recorders by leads 78 and 80. The recording head 76 records upon an endless magnetic tape 82 the signals fed thereto, such tape 82 being entrained over pulleys 84 and 86 and arranged to travel in the direction indicated by the arrow 88. The tape 82 travels from the recorder 76 to a pickup 90 which produces electrical pulses corresponding to those previously fed to the recording head 76 and recorded on the tape 82. The tape 82 is arranged to pass through a conventional tape eraser device 92 subsequent to passage through the pickup 90 and prior to passing through the recorder head 76. The output of the pickup 90 is fed by leads 94 and 96 to a counting rate meter or integrating circuit 98 that corresponds to the previously described counting rate meter or integrating circuit shown at 40.

The function of the counting rate meter or integrating circuit 98 is to produce an electrical signal that is either linear with respect to or proportional to the rate at which electrical pulses are produced by the detector 52 at a time an interval of time earlier determined equal to the time required for the tape to travel from the recording head 76 to the pickup 90.

The output of the counting rate meter or integrating circuit 98 is fed by leads 100 and 102 to a conventional variable gain amplifier 104; it being understood of course that the circuits 40 and 98, as is conventional, include such amplification components as are necessary to their own operation. The output of the amplifier 104 and the circuit 40 are fed to a mixing circuit 106 (described subsequently in greater detail) by pairs of leads 108 and 110, and 111 and 112, respectively.

The reason for simultaneously supplying the mixing circuit 106 with the signal from the circuit 40 that is a function of the concurrent rate of pulse production by the detector 24, and a signal from the circuit 98 that is a function of the rate of pulse production by the detector 52 at an earlier time arises from the fact that the detectors 52 and 24 are vertically spaced. Consequently, assuming that the housing 14 is being raised as is preferred in logging, the detector 52 passes a given position an interval of time before the detector 24 passes the same position determined by the spacing of the detectors and the rate that the housing 14 is being raised. The time delay between the pulse production of the detector 52 and the corresponding output signal of the circuit 82 is equal to the time required for the detectors 52 and 24 to successively pass a given position, as will be seen presently. With such time delay arrangement, the signals simultaneously fed by the circuits 40 and 98 to the mixing circuit 106 correspond to rates of pulse production by the detectors 24 and 52 when they occupy a single given vertical position, and reflect the characteristics of the earth formations 12 in the immediate vicinity of such single given vertical position.

Of course, it will be understood in the light of the preceding discussion by those skilled in the art, that the described signal delaying arrangement can be associated with the output of the detector 24 rather than detector 52 if logging is to be done by moving the housing 14 downwardly. It is only essential that the delay be such that the signals fed simultaneously to the mixing circuit 106 correspond to the rates of pulse production by the detectors 24 and 52 when they occupy a single given vertical position relative to the earth formations 12, irrespective of whichever of the detectors 24 or 52 and their related radiation sources are disposed uppermost in the housing 14 and irrespective of whether logging is upward or downward.

The mixing circuit 106 has for its purpose the production of an output electrical signal that is substantially solely a function of the oxygen content of the earth formations logged, it being noted that the electrical signal fed thereto by the leads 111 and 112 is a function of both hydrogen and oxygen content of the earth formations, while the electrical signal fed thereto by the leads 108 and 110 is a function substantially solely of the hydrogen content of the earth formations. Thus, in effect, the mixing circuit 106 is intended to perform the function of a simple computer. The more suitable the electrical circuitry of mixer circuit 106 to produce an electrical signal that is substantially solely a function of the oxygen concentration of the earth formations, the better. The nature of the functions represented by the signals fed to the mixer circuit 106 are in general fortunately sufficiently simple that the mixer circuit 106 can conveniently be a conventional subtractive circuit so that the output signal thereof represents simply the difference in magnitude between the signal fed thereto by the leads 111 and 112 and the signal fed thereto by the leads 108 and 110. It is, of course, to be understood that if deemed necessary or desirable, the mixer circuit 106 can incorporate features of conventional electrical analogue computers to portray more accurately variations in oxygen content in the earth formations.

The output signal of the mixer circuit 106 is fed by leads 114 and 116 to a conventional recorder 118 which records such signal versus the depth of the probe housing 14 in the borehole, a conventional operative connection being provided between the pulley 18 and the recorder 118 for this purpose as indicated by the dashed line 120. The previously mentioned necessary time delay occasioned by the spacing of the detectors 52 and 24 is obtained by the time required for individual portions of the tape 82 to pass from the recording head 76 to the pickup 90. For this latter purpose, the speed of travel of the magnetic tape 82 is maintained in proper relation to the logging speed by an operative connection established by the pulley 18 and the pulley 84 over which the tape 82 is entrained, as indicated by the dashed line 122.

Inasmuch as the electrical signal produced by the circuit 98 is in itself of interpretative value with respect to the hydrogen content of the earth formations, means is provided for recording such signal versus the depth of the probe housing 14 in the borehole 10 which comprises a recorder 124 similar to the recorder 118 connected to the leads 108 and 110 by leads 126 and 128. Like the recorder 118, the recorder 124 has an operative connection to the pulley 18, as indicated by the dashed line 130, so that the signal produced by the circuit 98 is recorded versus depth.

The operation of the illustrated apparatus will be readily understood. Reel 20 is driven so that the probe housing 14 is raised through the borehole 10 at a velocity comparable generally to that customarily used in neutron-neutron, or neutron gamma-ray logging procedures. It is preferred that the logging operation be conducted with the probe housing being moved upwardly rather than downwardly to obtain a lesser possibility of error in depth recording.

The source 50 and the detector 52 constitute a conventional neutron logging arrangement in themselves with the vertical spacing therebetween being conventional, say on the order of about 12 to 18 inches. The signal produced by the circuit 98 and recorded versus depth by the recorder 124 corresponds to either a neutron-neutron or a neutron gamma-ray log depending upon the specific character of the detector 52 used. As has been noted previously, it is preferred that the detector 52 be a neutron detector, especially an epithermal-neutron detector. It will be noted that the signal carried by the leads 108 and 110 that is equivalent to the detection rate of the detector 52 is delayed being fed to the mixer circuit 106 after the detector response by the amount of time that it takes individual portions of the magnetic tape 82 to pass from the recorder head 76 to the pickup 90, such time delay being equal to the time required for the recorder 24 to travel upwardly the distance of the vertical spacing between the detectors 24 and 52. This time relation is maintained irrespective of the logging speed by virtue of the ratio of velocities of the cable 16 and the magnetic tape 82, which is determined by the operative connection 122 between the pulleys 18 and 84, and by virtue of the spacings of the recorder head 76 and the pickup 90, as will be readily understood. Thus, the signal fed to the mixer circuit 106 by the leads 108 and 110 related to a particular portion of the earth formations 12 is fed to the mixer circuit 106 in coincidence with the signal fed thereto by the leads 111 and 112 associated with the same portion of the earth formations 12.

Like the detector 52, the detector 24 can be either a neutron or a gamma-ray detector, though as stated previously it is preferred that the same be a neutron detector, especially an epithermal-neutron detector. The spacing between the neutron source 22 and the detector 24 can be comparable to that used between the source 50 and the detector 52, say on the order of about 12 to 18 inches. It is preferred, however, that the spacing between the neutron source 22 and the detector 24 be equal to or slightly greater than the spacing defined in my previously mentioned application filed of even date, so that the response of the detector 24 will be predominantly a function of oxygen concentration rather than a function of both the hydrogen and oxygen concentration. A spacing of from about 5 to about 12 inches between the source 22 and the detector 24 is generally satisfactory.

Since varying borehole conditions and varying characteristics of the earth formations can result in the response of the detector 24 being effected by the hydrogen content of the earth formations, and since difficulties may be encountered in suitably spacing the source 22 from the detector 24 so as to substantially eliminate effects of hydrogen concentration in the earth formations, it is distinctly advantageous that the responses of the detectors 24 and 52 can be so correlated as to obtain a logging record substantially unaffected by variations in hydrogen concentration in the earth formations 12 by the provision of the mixer circuit 106. Inasmuch as the degree to which variations in hydrogen concentration affects the response of the detector 24 may vary from borehole to borehole, or possibly at different depths within a single borehole, the variable gain amplifier 104 suffices as a convenient means by which the response of the detector 52 can be in effect "weighted" in applying the correction obtained by the use of the mixer circuit 106 to the response of the detector 24 to obtain the log produced by the recorder 118. In other words, adjustment of the variable amplifier 104 affords a convenient means for calibrating the apparatus, whenever necessary, to a particular logging environment. As will be readily understood by those skilled in the art, the calibration can be achieved by making a series of logging runs through a borehole traversing formations of known oxygen content with differing adjustments of the variable amplifier 104, so as to arrive at such an adjustment of the amplifier 104 that the logging record produced by the recorder 118 corresponds most closely to the known oxygen concentration characteristics of the earth formations. When once so calibrated, the logging instrument can generally be used in a rather large variety of borehole logging environments without further adjustment of the amplifier 104 being necessary in order to achieve results of substantial interpretive value with respect to oxygen concentration.

The very great importance of obtaining a logging record of interpretive value with respect to oxygen concentration is derived from the fact that marked drops in oxygen concentration occur in earth formations through portions thereof that are saturated with liquid petroleum or petroleum gases, as such hydrocarbon mixtures are practically oxygen free. Such interpretive value is further enhanced by reason of the fact that the oxygen concentration of the solid component of various forms of sedimentary rocks is generally fairly uniform.

Means, not shown, of conventional character are provided for energizing the neutron source 22 (and the neutron source 50, if of the D-D type), the detectors 24 and 52, and the amplifiers 34 and 63. Preferably such means are of the type that include a source of electrical energy disposed at the earth's surface supplying energy to such probe housing contained elements through conductors in the cable 16. Illustration of such energizing means would serve no useful purpose as they are well known in the art. Similarly, it will be understood that conventional means are provided for energizing the various circuit elements, etc. situated at the earth's surface.

Rather than employing a single probe housing to concurrently obtain both detector responses as illustrated and described, it will be clear that a more laborious procedure can be employed to achieve comparable end results by obtaining such logs separately and recording each upon separate magnetic tapes or the like, and thereafter feeding the signals recorded upon the tapes in properly timed relation to a mixer circuit and recording the output of the mixer circuit with appropriate amplification of one of the signals fed to the mixer circuit. Such a devious method of achieving the desired end result is, of course, not preferred for the reasons that such a procedure would be very laborious, much more time consuming, admit greater possibilities of error, and present substantially greater calibration difficulties.

It will be evident to those skilled in the art that it is immaterial whether either neutron source is situated above or below its associated detector, and it will be also evident that it is immaterial whether the source 22 and detector 24 be disposed below, as shown, or disposed above the source 50 and detector 52. It is only essential that the response of the leading detector, whether logging upwardly or downwardly be delayed until the trailing detector reaches a position previously occupied by the leading detector.

It will also be evident to those skilled in the art that other signal delaying means can be employed than the illustrated and described system, though the latter is preferred.

The illustrated preferred embodiment of the invention is also subject to numerous other variations without departing from the spirit of the invention, and accordingly attention is directed to the appended claims in order to ascertain the actual scope of the invention.

I claim:

1. Apparatus for logging an earth formation traversed by a borehole comprising a pair of vertically spaced neutron sources, one of said sources producing neutrons having sufficient energy to cause disintegration of $_8O^{16}$ nuclei and the other of said sources producing no neutrons having sufficient energy to cause disintegration of $_8O^{16}$ nuclei, means for vertically moving the neutron sources along a borehole, means including a first detector for continuously producing a first electrical signal having a magnitude that is a function of the rate at which a selected class of penetrating radiation enters the borehole adjacent one neutron source, means including a second detector spaced from said first detector and having substantially the same characteristics as said first detector for continually producing a second electrical signal having a magnitude that is a function of the rate at which said selected class of penetrating radiation enters the borehole adjacent the other neutron source, means for producing a third electrical signal having a magnitude that is proportional to the magnitude of the first signal at a time displacement that substantially equals the time required for one neutron source to travel the vertical distance between the neutron sources, and means for producing an output electrical signal having a magnitude that is a function of the magnitude of the second signal and the third signal, and means for recording the output signal versus the depth of said one neutron source in the borehole.

2. The combination of claim 1, wherein the first detector is a gamma-ray detector, and wherein the second detector is a gamma-ray detector.

3. The combination of claim 1, wherein the first detector is a neutron detector, and wherein the second detector is a neutron detector.

4. The combination of claim 3, wherein each of said neutron detectors is an epithermal neutron detector.

5. Apparatus comprising a probe housing adapted to be moved vertically in a borehole, a first source of fast neutrons most of which have energies less than about five mev. disposed in the housing, a first detector of penetrating radiation in said housing adjacent said first neutron source, means for continuously effecting a first electrical signal having a magnitude dependent upon the rate at which said first detector detects penetrating radiation, a second neutron source in the housing spaced vertically from the first-mentioned neutron source, said second neutron source producing neutrons having energies of at least about eight mev., a second detector of penetrating radiation having the same characteristics as said first detector in the housing adjacent the second neutron source and spaced from said first detector, means for continuously effecting a second electrical signal dependent upon the rate at which the second detector detects penetrating radiation, a magnetic tape, means for vertically moving the probe housing and also for moving the magnetic tape at a proportional velocity, means for recording one of said electrical signals on the magnetic tape, means for reproducing the recorded electrical signal, said reproducing means being spaced from said recording means a distance such that the instant of any signal's reproduction is displaced in time from the instant of the same signal's recording by an amount that substantially equals the time required for one neutron source to travel the distance between neutron sources, means for producing a third electrical signal having a magnitude dependent upon the magnitudes of the reproduced electrical signal and the other electrical signal, and means for recording the third electrical signal versus the depth of the probe housing in a borehole.

References Cited in the file of this patent

UNITED STATES PATENTS

| 2,436,503 | Cleveland | Feb. 24, 1948 |
| 2,667,583 | Herzog | Jan. 26, 1954 |
| 2,712,081 | Fearon | June 28, 1955 |
| 2,769,096 | Frey | Oct. 30, 1956 |
| 2,862,106 | Scherbatskoy | Nov. 25, 1958 |

FOREIGN PATENTS

| 724,441 | Great Britain | Feb. 23, 1955 |